United States Patent
Kogure (10) Patent No.: US 10,880,486 B2
(45) Date of Patent: Dec. 29, 2020

(54) IMAGE PICKUP APPARATUS AND CONTROL METHOD THEREOF

(71) Applicant: CANON KABUSHIKI KAISHA, Tokyo (JP)

(72) Inventor: Kentaro Kogure, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/191,617

(22) Filed: Nov. 15, 2018

(65) Prior Publication Data

US 2019/0158752 A1 May 23, 2019

(30) Foreign Application Priority Data

Nov. 17, 2017 (JP) ................... 2017-221881

(51) Int. Cl.
| | |
|---|---|
| *H04N 5/232* | (2006.01) |
| *H04N 5/225* | (2006.01) |
| *G03B 15/02* | (2006.01) |
| *H04N 5/235* | (2006.01) |

(52) U.S. Cl.
CPC ......... *H04N 5/23296* (2013.01); *G03B 15/02* (2013.01); *H04N 5/2254* (2013.01); *H04N 5/2256* (2013.01); *H04N 5/2351* (2013.01); *H04N 5/2352* (2013.01)

(58) Field of Classification Search
CPC ............. H04N 5/23296; H04N 5/2254; H04N 5/2351; H04N 5/2352; H04N 5/2256; G03B 15/02

See application file for complete search history.

(56) References Cited

U.S. PATENT DOCUMENTS

| 8,515,275 B2 | 8/2013 | Machida et al. |
| 2002/0039490 A1* | 4/2002 | Hagiuda ............. G03B 15/03 396/155 |
| 2006/0173918 A1* | 8/2006 | Nakase ............. H04N 1/00384 |

(Continued)

FOREIGN PATENT DOCUMENTS

| CN | 101604110 A | 12/2009 |
| CN | 101750844 A | 6/2010 |

(Continued)

OTHER PUBLICATIONS

Extended European Search Report issued in European Appln. No. 18206408.9 dated Apr. 3, 2019.

(Continued)

*Primary Examiner* — Gevell V Selby
(74) *Attorney, Agent, or Firm* — Rossi, Kimms & McDowell LLP (57) ABSTRACT

An image pickup apparatus aims to control an illuminating part so as to obtain an image of good visibility irrespectively of a state of a zooming operation under dark environment. The image pickup apparatus has an image pickup part including a zoom lens, and a lens driving part configured to drive the zoom lens in an optical axis direction. The image pickup apparatus is capable of performing shooting by using an illuminating part configured to irradiate a subject with light. The image pickup apparatus comprises a control unit configured to control a dimming speed of the illuminating part according to drive information of the zoom lens.

20 Claims, 9 Drawing Sheets

(56) References Cited

U.S. PATENT DOCUMENTS

| | | | |
|---|---|---|---|
| 2008/0122927 A1 | 5/2008 | Konno et al. | |
| 2014/0300809 A1* | 10/2014 | Oliveira | H04N 5/232 348/376 |
| 2016/0027042 A1* | 1/2016 | Heeter | G06Q 30/0248 705/14.47 |
| 2018/0074284 A1* | 3/2018 | Ono | G03B 5/00 |

FOREIGN PATENT DOCUMENTS

| | | |
|---|---|---|
| JP | S62178934 A | 8/1987 |
| JP | 2005017812 A | 1/2005 |
| JP | 5223870 B2 | 6/2013 |
| KR | 1020140085851 A | 7/2014 |

OTHER PUBLICATIONS

Office Action issued in Chinese Appln. No. 201811367016.0 dated Jul. 24, 2020. English machine translation provided.

* cited by examiner

|  | PAN-TILT DRIVING SPEED | | |
|---|---|---|---|
|  | SLOW | · · · | FAST |
| ZOOM LENS CURRENT POSITION — WIDE | 100 % | · · · | 150 % |
| · · · | · · · | · · · | · · · |
| TELE | 150 % | · · · | 200 % |

IMAGE PICKUP APPARATUS AND CONTROL METHOD THEREOF

BACKGROUND OF THE INVENTION

Field of the Invention

The present invention relates to an image pickup apparatus such as a monitoring camera, and a control method thereof.

Description of the Related Art

Monitoring cameras on which infrared illuminating apparatuses are mounted are becoming popular, and there are various types of monitoring cameras according to installation environment of a wide-lens angle or a high magnification lens or a monitoring target subject. A camera on which a high magnification lens is mounted in particular demands that an optimal infrared illuminating apparatus is controlled in an interlocking manner with power which can radiate infrared illumination light over a long distance and a zooming operation.

On the other hand, cameras on which infrared illuminating apparatuses which radiate beams of infrared illumination light of a plurality of different irradiation angles are a mainstream.

For example, Japanese Patent No. 5223870 discloses a technique which includes a light emitting part which can emit light of a plurality of different colors and light emission amounts as illumination light, and which causes a light emission controlling part controlling the light emitting part to continuously emit the illumination light while changing the color and the light emission amount according to an elapsed time irrespectively of shooting of a camera.

A camera of this type is demanded to change a rate of an illumination intensity of infrared illumination light of a plurality of different illumination angles according to a zoom magnification. However, Japanese Patent No. 5223870 has a problem that an angle of view is not taken into account, and therefore a light quantity drop occurs during zooming.

SUMMARY OF THE INVENTION

The present invention provides an image pickup apparatus and a control method of the image pickup apparatus which control an illuminating part so as to obtain an image of good visibility irrespectively of a state of a zooming operation under dark environment.

The present invention provides an image pickup apparatus having an image pickup part including a zoom lens, and a lens driving part configured to drive the zoom lens in an optical axis direction, and being capable of performing shooting by using an illuminating part configured to irradiate a subject with light, the image pickup apparatus comprising: at least one processor or circuit programmed to function as: a control unit configured to control a dimming speed of the illuminating part according to drive information of the zoom lens.

The present invention can obtain an image of good visibility irrespectively of a state of a zooming operation under dark environment.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

First Embodiment

Figure 1:
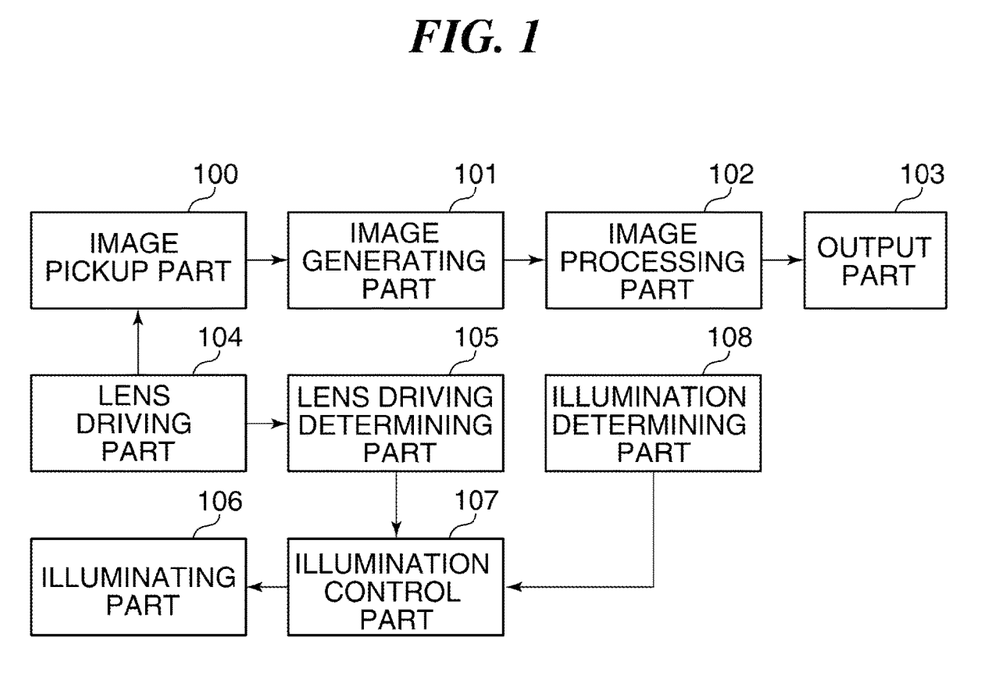
FIG. 1 is a block diagram showing a configuration of a digital camera according to a first embodiment of an image pickup apparatus of the present invention.
Figure 2:
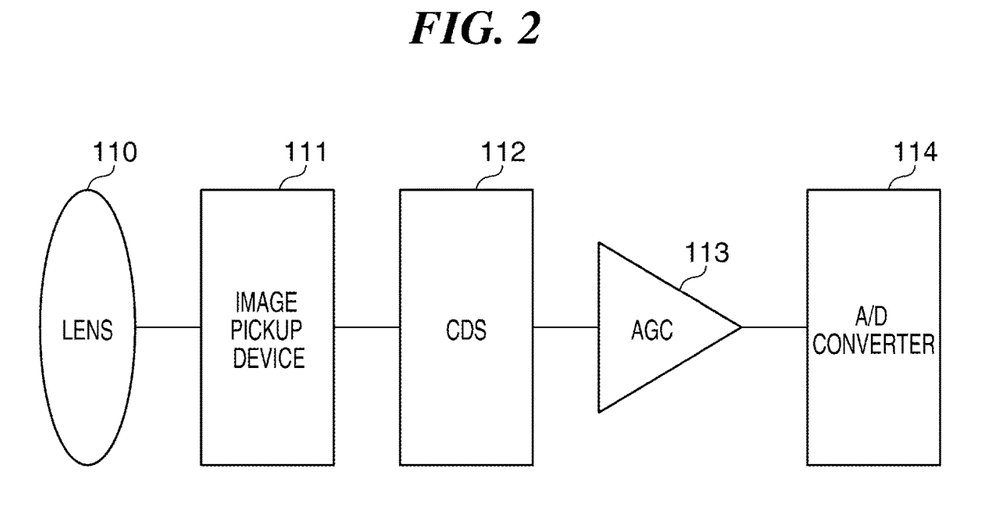
FIG. 2 is a block diagram showing an image pickup part which composes the digital camera shown in FIG. 1.

FIG. 1 is a block diagram showing a configuration of a digital camera according to the first embodiment of an image pickup apparatus according to the present invention. FIG. 2 is a block diagram showing an image pickup part 100 which composes the digital camera shown in FIG. 1.

As shown in FIG. 1, a digital camera (hereinafter referred to as the "camera") according to the present embodiment includes an image pickup part 100, an image generating part 101, an image processing part 102, an output part 103, a lens driving part 104, a lens driving determining part 105, an illuminating part 106, an illumination control part 107, and an illumination determining part 108.

The image pickup part 100 takes in light from an outside and picks up an image, and, as shown in FIG. 2, includes a lens 110 which includes a group of a plurality of lenses including a zoom lens and a focus lens, and an image pickup device 111 such as a CCD sensor and a CMOS sensor. Furthermore, the image pickup part 100 includes a correlated double sampling (CDS) circuit 112 which reduces noise, and an automatic gain control (AGC) amplifier circuit 113 which automatically controls a gain of a camera. Furthermore, the image pickup part 100 includes an A/D conversion circuit 114 which converts an analog signal into a digital signal.

As shown in FIGS. 1 and 2, the image pickup device 111 converts a subject image formed via the lens 110, which is an image pickup optical system, into an electrical signal. The CDS circuit 112 performs correlated double sampling processing on the electrical signal outputted from the image pickup device 111. The AGC amplifier circuit 113 performs amplification processing on the electrical signal outputted from the CDS circuit 112. The A/D conversion circuit 114 converts the analog signal subjected to the amplification processing by the AGC amplifier circuit 113 into a digital signal.

As shown in FIG. 1, the image generating part 101 generates a digital image from the digital signal obtained by the image pickup part 100. The image processing part 102 performs various types of image processing on the image generated by the image generating part 101. In this regard, the image processing includes noise reduction processing, white balance processing, tone correction, gamma correction, and edge enhancement. The output part 103 outputs the image subjected to the various types of image processing by the image processing part 102.

The lens driving part 104 drives the lens 110 of the image pickup part 100. The lens 110 is moved in an optical axis direction in a range from a wide side to a tele side by the lens driving part 104. The lens driving determining part 105 determines whether or not the lens driving part 104 drives the lens 110.

The illuminating part 106 irradiates the subject picked up by the image pickup part 100 with illumination light. It should be noted that the illuminating part 106 may be integrated with a camera, or may be externally connected and detachable. Furthermore, a wavelength component of light radiated by the illuminating part 106 may be any wavelength component such as visible light or infrared light included in spectral sensitivity of the image pickup device 111. The illumination control part 107 controls an illumination intensity of the illuminating part 106. The illumination intensity may be manually changed or may be automatically changed in response to an external change in conditions. Furthermore, a change rate of an illumination intensity may be arbitrarily changed. The illumination determining part 108 determines whether the illuminating part 106 is activated or deactivated.

Figure 3:
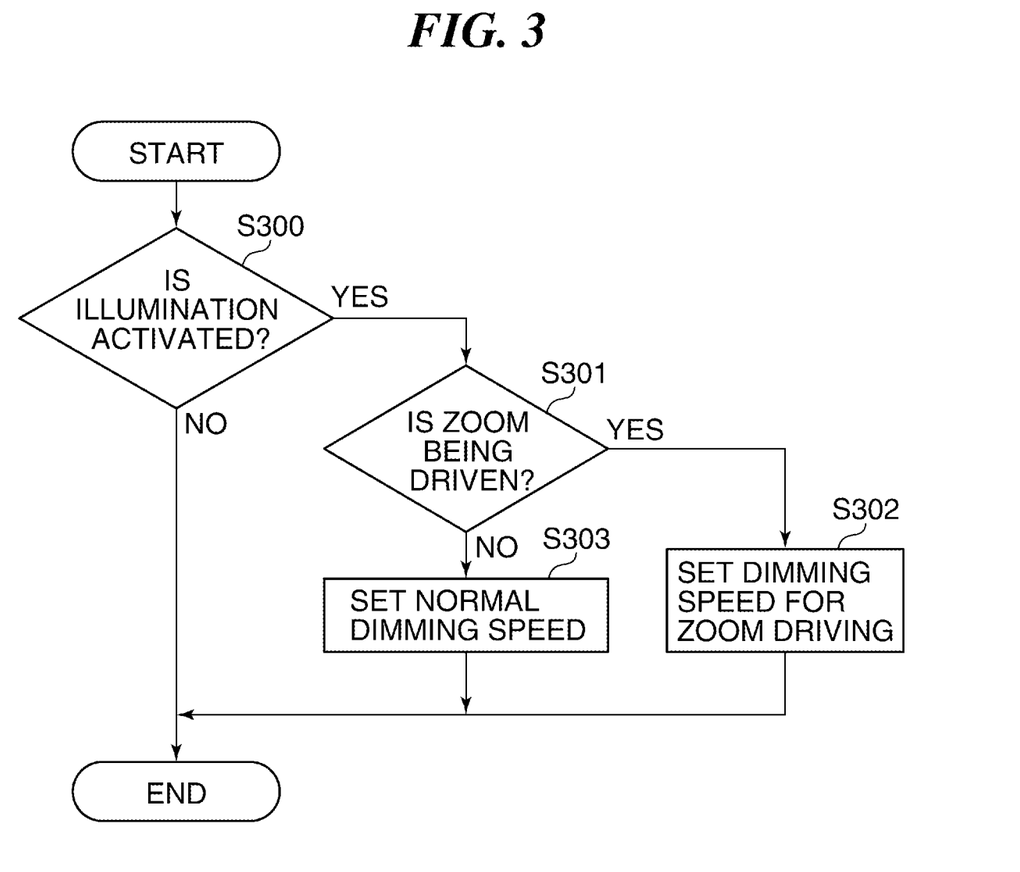
FIG. 3 is a flowchart useful in explaining processing of the digital camera shown in FIG. 1.

Next, processing of a camera will be described with reference to FIG. 3. Each processing in FIG. 3 is performed when a program stored in a ROM of an unillustrated system control circuit of the camera is expanded to a RAM and is executed by a CPU. According to the present embodiment, it should be noted that the CPU functions as at least one of each part shown in FIGS. 1 and 2.

In FIG. 3, in step S300, the illumination determining part 108 determines whether the illuminating part 106 is activated or deactivated. In this regard, it may be determined that the illuminating part 106 is activated or deactivated by using a result obtained by selecting activation or deactivation of the illuminating part 106 set by a user. Furthermore, whether control of the illuminating part 106 in the illumination control part 107 is activated or deactivated may be determined. Furthermore, when it is determined that the illuminating part 106 is activated, process proceeds to step S301. When it is determined that the illuminating part 106 is deactivated, the processing is terminated.

In step S301, the lens driving determining part 105 determines whether or not the zoom lens of the lens 110 is determined as zoom lens drive information. It should be noted that it may be determined that the zoom lens is being driven during a period in which the zoom lens moves to a designated absolute position or during a period in which the zoom lens relatively moves from a predetermined position. Furthermore, as a unit which substitutes the lens driving determining part 105, a distance measurement sensor or another unit such as an image pattern recognizing unit may be used to determine a change in an angle of view or a focal distance.

Furthermore, when the lens driving determining part 105 determines that the zoom lens is being driven, the process proceeds to step S302. When this is not the case, the process proceeds to step S303.

In step S302, the illumination control part 107 changes a dimming speed for controlling the illumination intensity of the illuminating part 106 to a dimming speed during zoom driving different from a normal dimming speed, followed by the process being terminated. The dimming speed during zoom driving may be determined in advance, or may be determined according to a zoom driving speed, a zoom driving time and a zoom driving direction which are zoom lens drive information.

Figure 4:
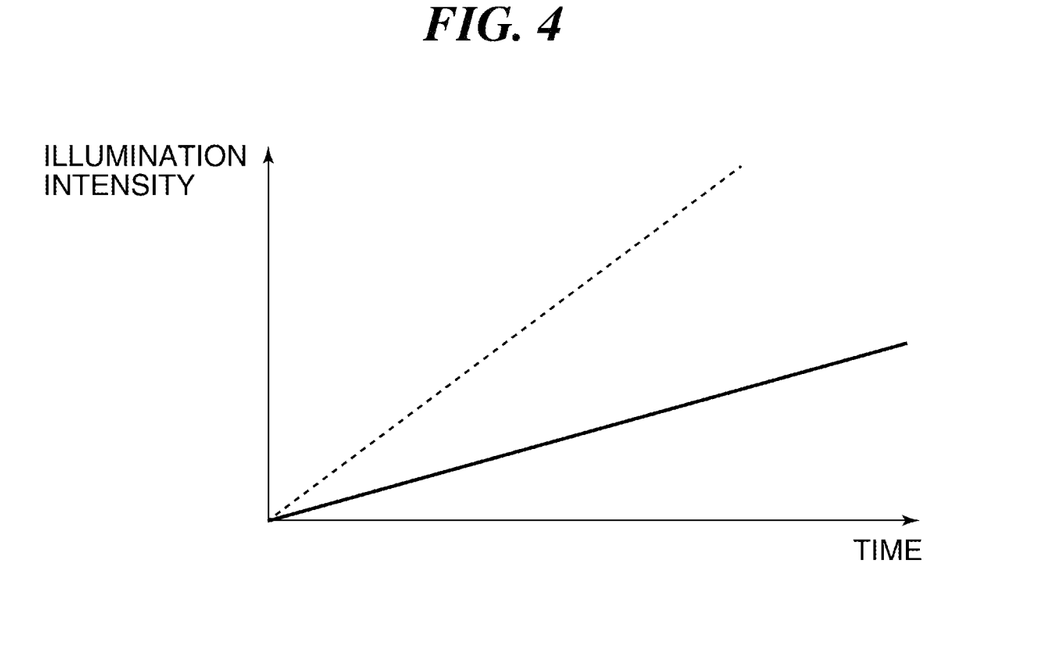
FIG. 4 is a graph showing a relationship between an illumination intensity and a time of an illuminating part.
Figure 5:
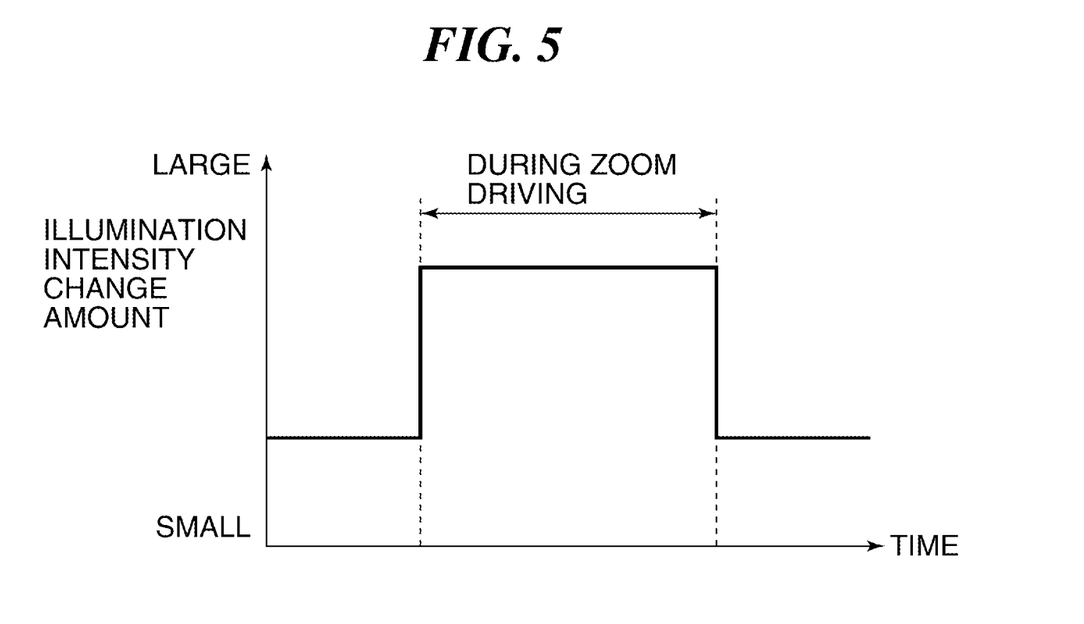
FIG. 5 is a graph showing a relationship between a change amount of the illumination intensity and a time during zoom driving.

FIG. 4 is a graph showing a relationship between an illumination intensity and a time of the illuminating part 106. A solid line in FIG. 4 indicates a normal dimming speed, and a broken line indicates a dimming speed during zoom driving different from the normal dimming speed. Furthermore, as shown in shown in FIG. 5, a rate of a change amount of the illumination intensity per unit time of the illuminating part 106 may be changed for the dimming speed for controlling the illumination intensity of the illuminating part 106. By changing the rate of the change amount of the illumination intensity per unit time, it is possible to improve responsivity for changing the illumination intensity of the illuminating part 106 stepwise.

On the other hand, in step S303, a system control circuit sets the dimming speed for controlling the normal illumination intensity of the illuminating part 106, and the processing is finished.

As described above, in the present embodiment, the dimming speed is changed when the illumination intensity of the illuminating part 106 is controlled according to whether or not the zoom lens is being driven. Consequently, it is possible to obtain images of good visibility irrespectively of a state of a zooming operation under dark environment without a light source.

Second Embodiment

Figure 7:
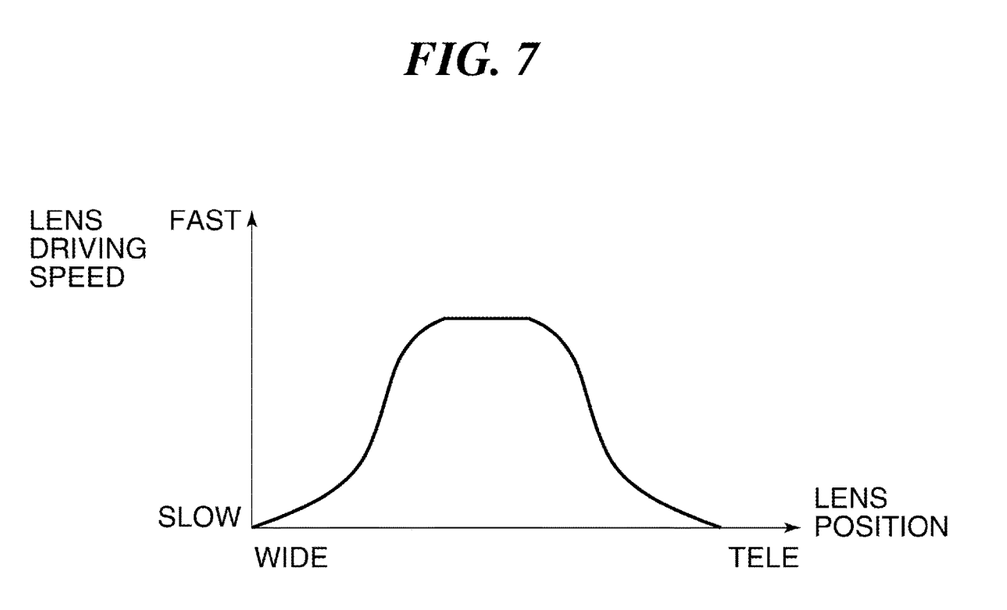
FIG. 7 is a graph showing a relationship between a lens position and a lens driving speed during zoom driving.
Figure 8:
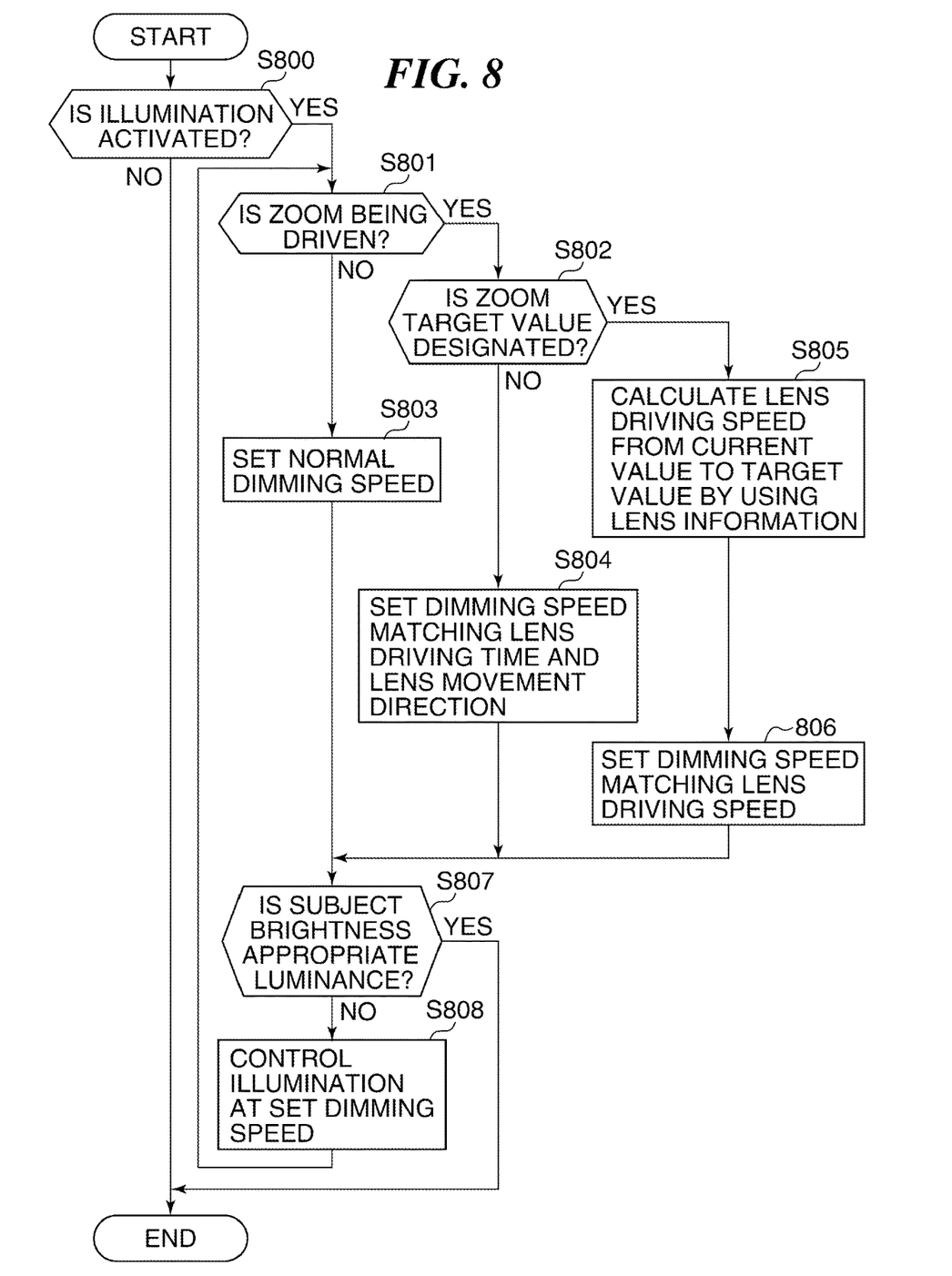
FIG. 8 is a flowchart useful in explaining processing of a digital camera shown in FIG. 6.

A camera according to the second embodiment of an image pickup apparatus of the present invention will be described with reference to FIGS. 6 to 8. It should be noted that parts which overlap those of the above first embodiment will be assigned the same reference numerals in the drawings, which will not be, therefore, described in the present embodiment.

Figure 6:
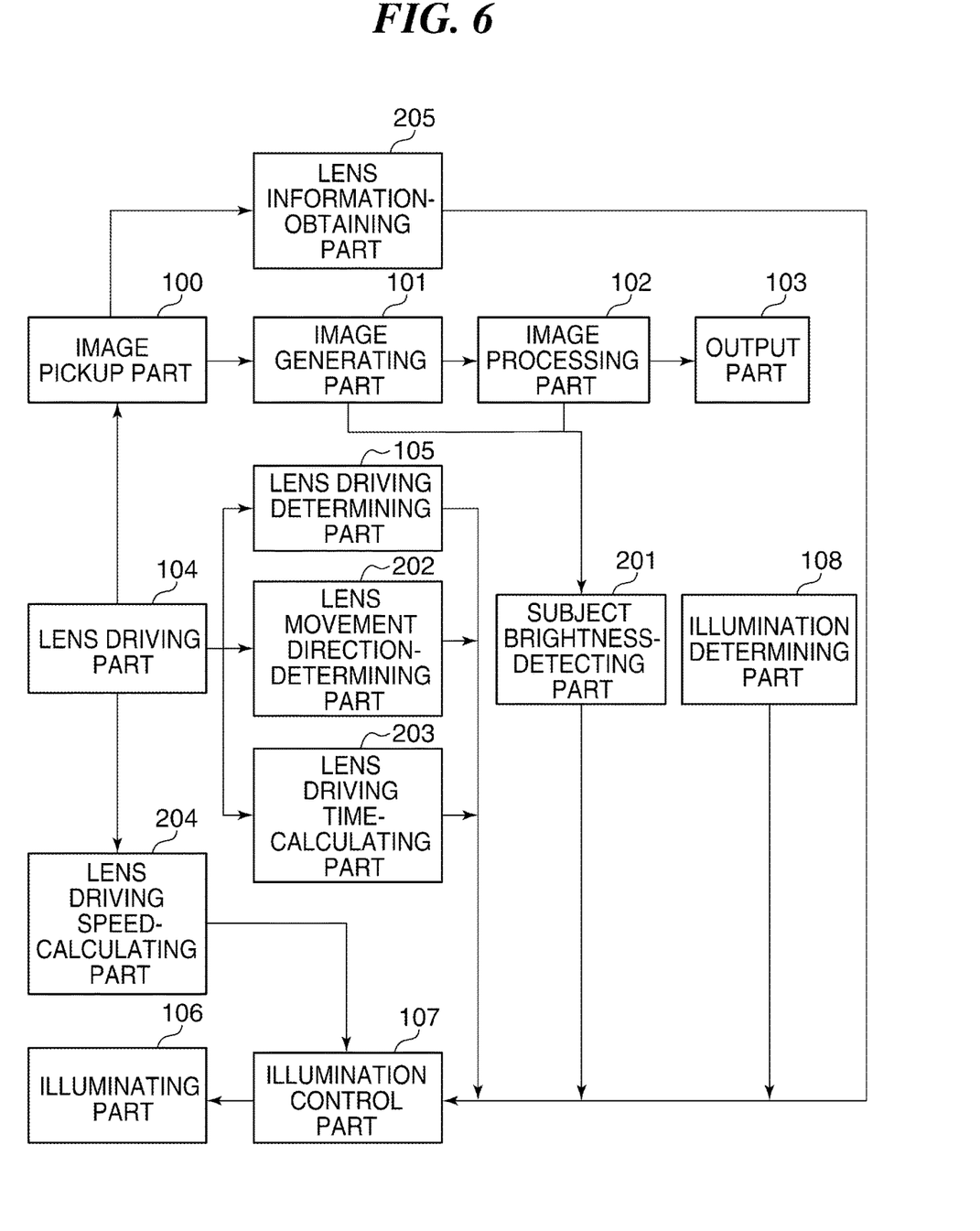
FIG. 6 is a block diagram showing a configuration of a digital camera according to a second embodiment of an image pickup apparatus of the present invention.

FIG. 6 is a block diagram showing a configuration of a camera. As shown in FIG. 6, the camera according to the present embodiment includes a subject brightness-detecting part 201, a lens movement direction-determining part 202, a lens driving time-calculating part 203, a lens driving speed-calculating part 204, and a lens information-obtaining part 205 in addition to the camera (see FIGS. 1 and 2) according to the above first embodiment.

The subject brightness-detecting part 201 detects a brightness of a subject from an image picked up by the image pickup part 100. In this regard, the subject brightness may be detected for an image subjected to brightness correction such as gamma correction by the image processing part 102 or at a stage prior to image processing. Furthermore, instead of detecting the subject brightness from the image, the subject brightness may be detected by using a photometric sensor for subject brightness detection. The lens movement direction-determining part 202 determines whether the zoom lens in the lens 110 changes toward a wide side or changes toward a tele side.

The lens driving time-calculating part 203 calculates a time during which the zoom lens is driven. A lens driving time is a time from a start to an end of driving of the zoom lens. The lens driving speed-calculating part 204 calculates a driving speed of the zoom lens. The driving speed of the zoom lens may be a current driving speed or a predetermined driving speed. FIG. 7 is a graph showing an example of a lens driving speed when the zoom lens zooms from a wide position to a tele position in relation to the predetermined lens driving speed.

The lens information-obtaining part 205 obtains information related to the lens 110. In this regard, lens information includes a current position of the zoom lens, a target position of the zoom lens, a zoom magnification, an angle of view range, a settable driving speed of the zoom lens and an aperture F value per current position of the zoom lens.

Next, processing of the camera will be described with reference to FIG. 8. Each processing in FIG. 8 is performed when a program stored in a ROM of an unillustrated system control circuit of the camera is expanded to a RAM and is executed by a CPU. It should be noted that, according to the present embodiment, the CPU functions as at least one of each part shown in FIG. 6. It should be noted that, in FIG. 8, step S800, step S801, and step S803 are the same processing as those in step S300, step S301, and step S303 in the above first embodiment (see FIG. 3), which will not be, therefore, described in detail.

When the lens driving determining part 105 determines in step S801 that the zoom lens is driven, it is determined in step S802 whether or not a target value of the zoom lens obtained from the lens information-obtaining part 205 is designated. Furthermore, when the target value of the zoom lens is designated, the process proceeds to step S805, whereas when this is not the case, the process proceeds to step S804.

In step S804, a dimming speed matching the driving time of the zoom lens calculated by the lens driving time-calculating part 203 and the movement direction of the zoom lens determined by the lens movement direction-determining part 202 is set to the illumination control part 107, and the process proceeds to step S807. In this regard, when the driving time of the zoom lens calculated by the lens driving time-calculating part 203 is longer, the dimming speed may be set faster. Furthermore, the lens movement direction determined by the lens movement direction-determining part 202 may be set by taking into account a change in an aperture value (F value) during zoom driving obtained from the lens information-obtaining part 205, and the dimming speed in a case of movement in the tele direction instead of the wide direction may be set relatively fast.

On the other hand, in step S805, the lens driving speed-calculating part 204 calculates the lens driving speed from a current position of the zoom lens to the target value of the zoom lens obtained by the lens information-obtaining part 205, and the process proceeds to step S806.

In step S806, the dimming speed is set to the illumination control part 107 according to the lens driving speed calculated in step S805, and the process proceeds to step S807. Furthermore, even when the normal dimming speed is set in step S803, the process proceeds to step S807.

In step S807, whether or not a predetermined brightness level is satisfied is determined assuming that a luminance of the image detected by the subject brightness-detecting part 201 is appropriate. In this regard, a criterion for the appropriate luminance may be determined according to whether or not part or entirety of the brightness level of a predetermined image is satisfied. Furthermore, the image detected by the subject brightness-detecting part 201 may be any image before and after image processing. Furthermore, the subject brightness may be detected by using an external photometric sensor instead of the image. Furthermore, when the luminance of the image detected by the subject brightness-detecting part 201 is appropriate, the process is terminated, whereas when this is not the case, the process proceeds to step S808.

In step S808, the illumination control part 107 controls the illuminating part 106 according to the set dimming speed, followed by the process returning to step S801.

As described above, according to the present embodiment, the dimming speed for controlling the illumination intensity of the illuminating part 106 is changed according to whether or not the zoom lens is being driven, and, when the subject brightness is not an appropriate luminance after the change, illumination of the illuminating part 106 is controlled according to the changed dimming speed. The other configurations, functions and effects are the same as those of the above first embodiment.

Third Embodiment

Figure 10:
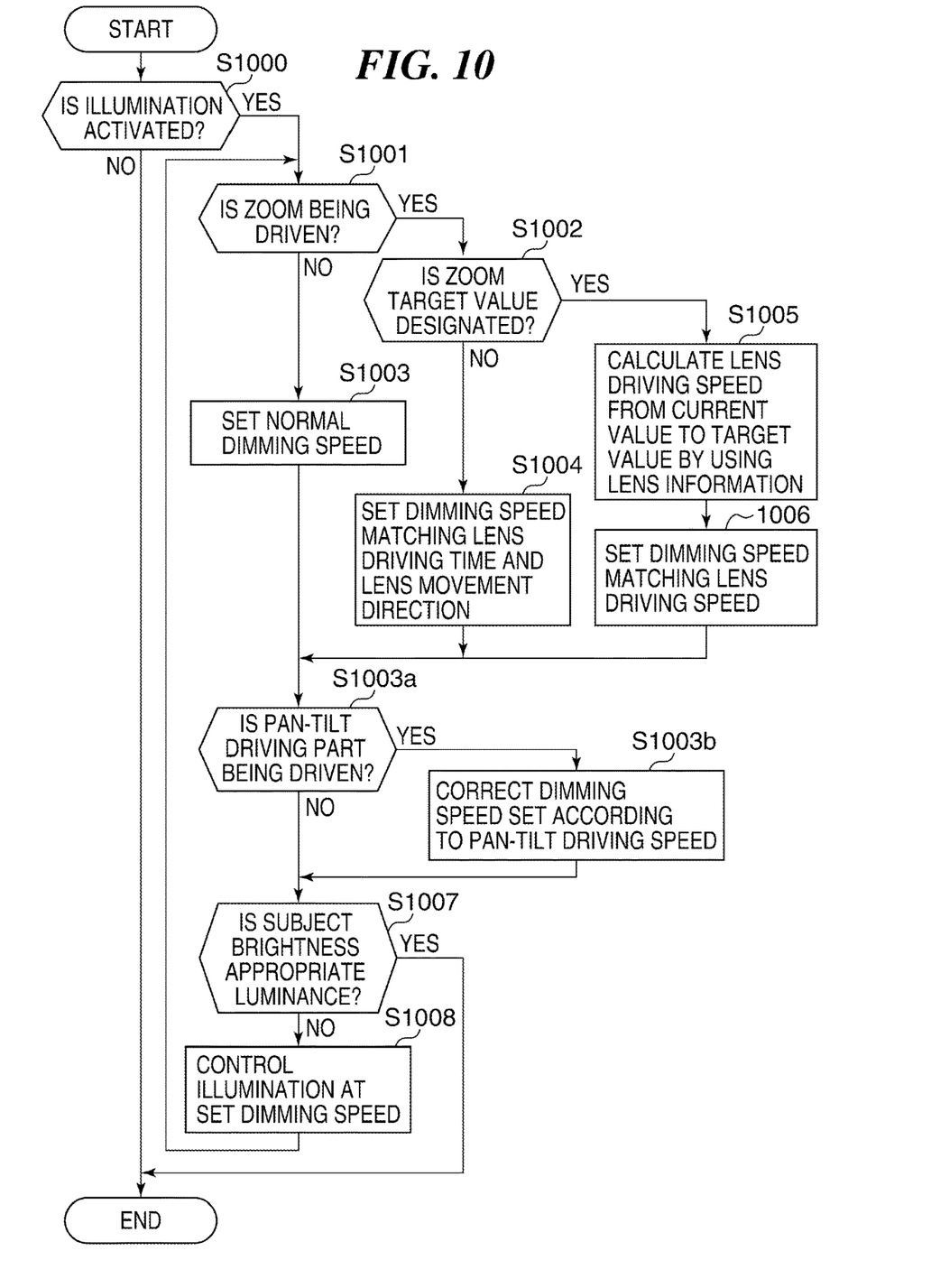
FIG. 10 is a flowchart useful in explaining processing of a digital camera shown in FIG. 9.
Figure 11:
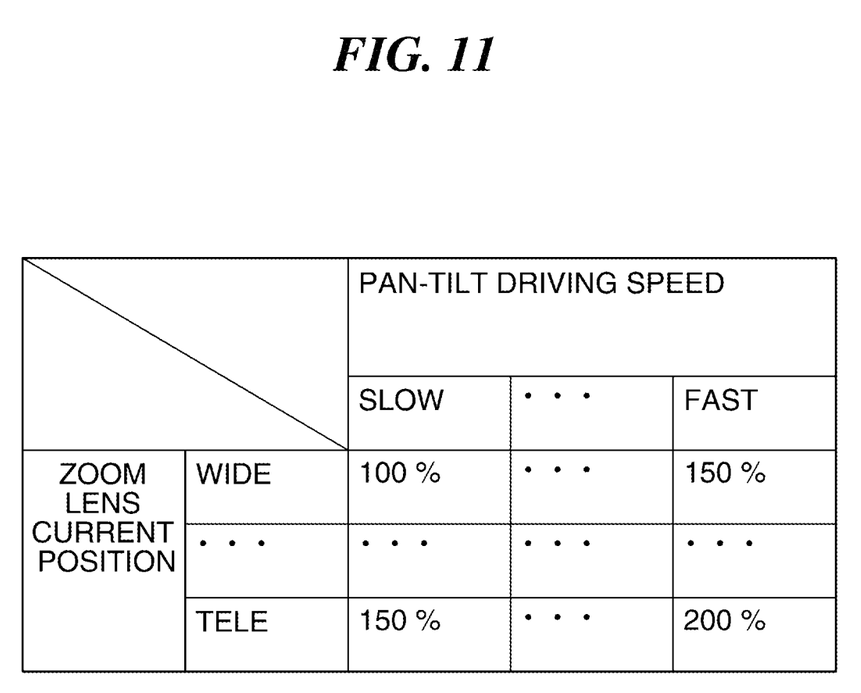
FIG. 11 is a view showing a table example of a correction coefficient of a dimming speed matching a current position of a zoom lens and a current speed of a pan-tilt driving part.

Next, a camera according to the third embodiment of an image pickup apparatus of the present invention will be described with reference to FIGS. 9 to 11. It should be noted that parts which overlap those of the above first embodiment and the above second embodiment will be assigned the same reference numerals in the drawings, which will not be, therefore, described in the present embodiment.

Figure 9:
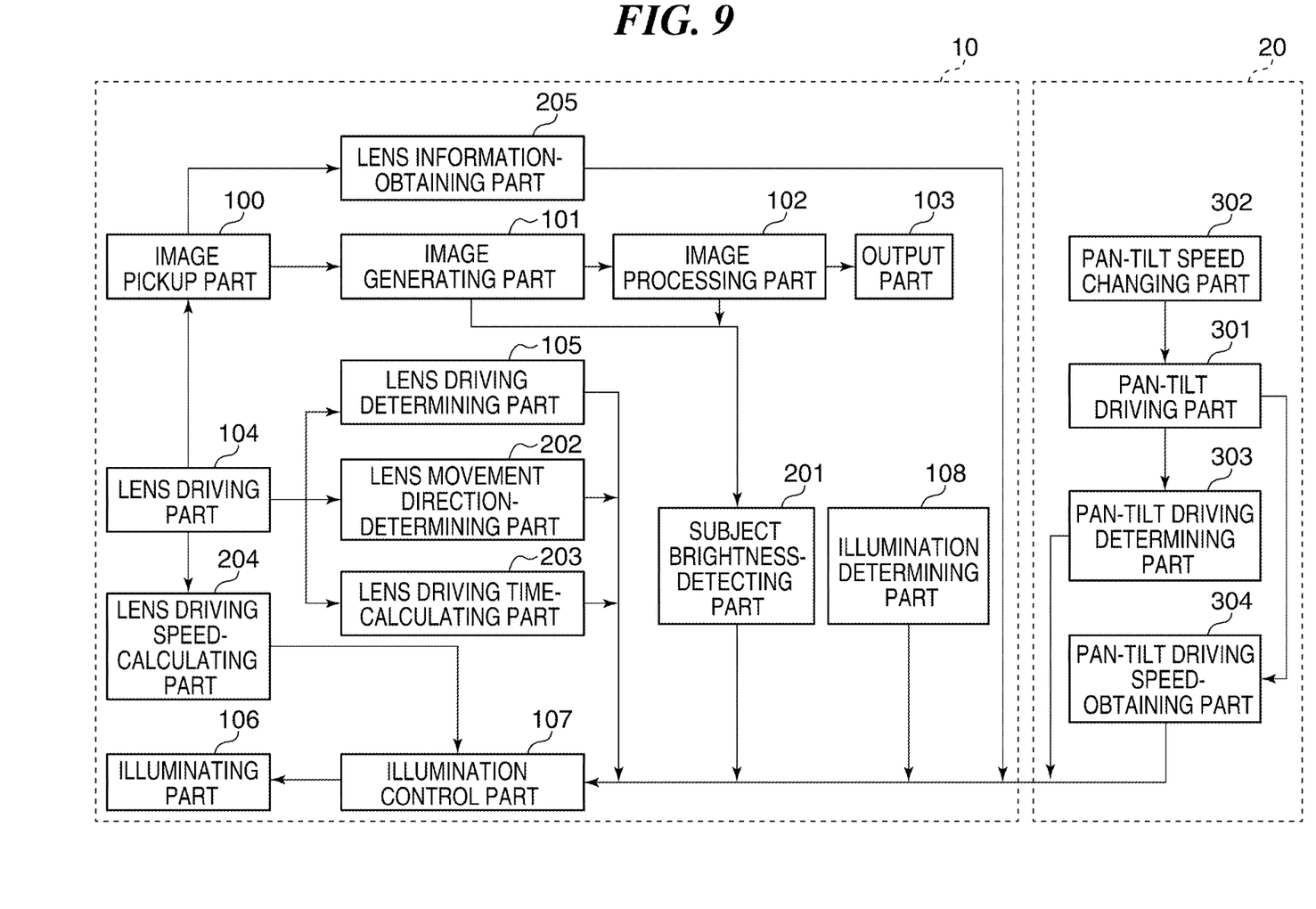
FIG. 9 is a block diagram showing a configuration of a digital camera according to a third embodiment of an image pickup apparatus of the present invention.

As shown in FIG. 9, the camera according to the present embodiment includes the camera (see FIG. 6) according to the above second embodiment as a camera main body 10, and a pan-tilt driving apparatus 20 drives the camera main body 10 in a pan-tilt direction. The pan-tilt driving apparatus 20 includes a pan-tilt driving part 301, a pan-tilt speed changing part 302, a pan-tilt driving determining part 303, and a pan-tilt driving speed-obtaining part 304.

The pan-tilt driving part 301 includes, for example, a stepping motor, and drives a shooting direction of the camera main body 10 in at least one of a pan direction and a tilt direction. It should be noted that, instead of the entire camera main body 10 in the pan/tilt direction, the image pickup part 100 may be driven in the pan/tilt direction.

The pan-tilt speed changing part 302 changes driving speeds in the pan direction and the tilt direction of the pan-tilt driving part 301. In this case, the driving speed in the pan direction and the driving speed in the tilt direction may be the same speed or may be different speeds. Furthermore, the driving speed may not be fixed, and may be accelerated or decelerated at start of driving, during driving or at stop of driving.

The pan-tilt driving determining part 303 determines whether or not the pan-tilt driving part 301 is performing driving in the pan direction/tilt direction. The pan-tilt driving speed-obtaining part 304 obtains the driving speed at which the pan-tilt driving part 301 performs driving.

Next, processing of the camera will be described with reference to FIG. 10. Each processing in FIG. 10 is performed when a program stored in a ROM of an unillustrated system control circuit of the camera is expanded to a RAM and is executed by a CPU. It should be noted that, according to the present embodiment, the CPU functions as at least one of each part shown in FIG. 9. It should be noted that, in FIG.

10, step S1000 to step S1006, step S1007 and step S1008 are the same processing as those in step S800 to step S808 in the above second embodiment (see FIG. 8), which will not be described in detail.

First, after the illumination control part 107, therefore, sets the dimming speed in step S1003, step S1004 or step S1006, the process proceeds to step S1003*a*. In step S1003*a*, the pan-tilt driving determining part 303 determines whether or not the pan-tilt driving part 301 is performing driving. Furthermore, when the pan-tilt driving determining part 303 determines that the pan-tilt driving part 301 is performing driving, the process proceeds to step S1003*b*, whereas this is not the case, the process proceeds to step S1007.

In step S1003*b*, the dimming speed set to the illumination control part 107 is corrected according to a pan-tilt driving speed, and the process proceeds to step S1007. In this case, as shown in, for example, FIG. 11, the dimming speed is corrected by referring to a correction coefficient table of the pan-tilt driving speed with respect to a current position of the zoom lens. It should be noted that, when the zoom driving speed is faster and the pan/tilt driving speed is faster, the correction coefficient may be made higher. The other configurations, functions and effects are the same as those of the above first embodiment and the above second embodiment.

It should be noted that the present invention is not limited to each of the above embodiments, and can be optionally changed without departing from the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221881, filed Nov. 17, 2017 which is hereby incorporated by reference wherein in its entirety.

What is claimed is:

1. An image pickup apparatus having an image pickup part including a zoom lens, and a lens driving part configured to drive the zoom lens in an optical axis direction, and configured to perform shooting by using an illuminating part configured to irradiate a subject with light, the image pickup apparatus comprising:
    at least one processor or circuit programmed to function as:
        a control unit configured to change a dimming speed of the illuminating part based on drive information related to the driving of the zoom lens.
2. The image pickup apparatus according to claim 1,
    wherein the processor or circuit is further programmed to function as a lens driving determining unit configured to determine whether the zoom lens is being driven, and
    wherein the control unit is further configured to change the dimming speed when the lens driving determining unit determines that the zoom lens is being driven, compared to when the lens driving determining unit does not determine that the zoom lens is being driven.
3. The image pickup apparatus according to claim 2,
    wherein the processor or circuit is further programmed to function as an illumination determining unit configured to determine whether the illuminating part is activated or deactivated, and
    wherein the control unit is further configured to change the dimming speed when the illumination determining unit determines that the illuminating part is activated and the lens driving determining unit determines that the zoom lens is being driven, compared to when the lens driving determining unit does not determine that the zoom lens is being driven.
4. The image pickup apparatus according to claim 1,
    wherein the processor or circuit is further programmed to function as a brightness detecting unit configured to detect a brightness of the subject picked up by the image pickup part, and
    wherein the control unit is further configured to dim the illuminating part when the brightness of the subject detected by the brightness detecting unit is darker than a predetermined brightness level.
5. The image pickup apparatus according to claim 1, wherein the control unit is further configured to change the dimming speed by changing a rate of a change amount of an illumination intensity of the illuminating part per unit time.
6. The image pickup apparatus according to claim 1,
    wherein the processor or circuit is further programmed to function as a movement direction determining unit configured to determine a movement direction of the zoom lens, and
    wherein the control unit is further configured to relatively increase the dimming speed when the movement direction determining unit determines that the zoom lens moves toward a tele side compared to when the zoom lens moves toward a wide side.
7. The image pickup apparatus according to claim 1,
    wherein the processor or circuit is further programmed to function as a driving speed calculating unit configured to calculate a driving speed at which the lens driving part drives the zoom lens, and wherein the control unit is further configured to change the dimming speed according to the driving speed of the zoom lens calculated by the driving speed calculating unit.

8. The image pickup apparatus according to claim 7, wherein the driving speed calculating unit is further configured to calculate a driving speed from a current position to a target position of the zoom lens.

9. The image pickup apparatus according to claim 2, wherein the processor or circuit is further programmed to function as a driving time calculating unit configured to calculate a time during which the lens driving determining unit determines that the zoom lens is being driven, and wherein the control unit is further configured to change the dimming speed according to a driving time calculated by the driving time calculating unit.

10. The image pickup apparatus according to claim 2, wherein the processor or circuit is further programmed to function as an obtaining unit configured to obtain an aperture F value per current position of the zoom lens, and wherein the control unit is further configured to change the dimming speed according to the aperture F value obtained by the obtaining unit.

11. The image pickup apparatus according to claim 1, further comprising a pan-tilt driving apparatus configured to drive at least the image pickup part in a pan direction and a tilt direction, and change a shooting direction of the image pickup part, wherein the pan-tilt driving apparatus is further configured to obtain a driving speed in the pan direction or the tilt direction, and the control unit is further configured to change the dimming speed according to the driving speed obtained by the pan-tilt driving apparatus.

12. The image pickup apparatus according to claim 11, wherein the pan-tilt driving apparatus is further configured to change the driving speed in the pan direction or the tilt direction.

13. The image pickup apparatus according to claim 1, wherein the illuminating part is further configured to radiate infrared light.

14. The image pickup apparatus according to claim 1, wherein the illuminating part is configured to be detachable from the image pickup apparatus.

15. A control method for an image pickup apparatus having an image pickup part including a zoom lens, and a lens driving part configured to drive the zoom lens in an optical axis direction, and configured to perform shooting by using an illuminating part configured to irradiate a subject with light, the control method comprising:

changing a dimming speed of the illuminating part based on drive information related to the driving of the zoom lens.

16. The control method according to claim 15, further comprising determining whether the zoom lens is being driven, wherein the dimming speed is changed when it is determined that the zoom lens is being driven, compared to when it is not determined that the zoom lens is being driven.

17. The control method according to claim 16, further comprising determining whether the illuminating part is activated or deactivated, wherein the dimming speed is changed when it is determined that the illuminating part is activated and it is determined that the zoom lens is being driven, compared to when it is not determined that the zoom lens is being driven.

18. The control method according to claim 15, further comprising detecting a brightness of the subject picked up by the image pickup part, wherein the illuminating part is dimmed when the detected brightness of the subject is darker than a predetermined brightness level.

19. The control method according to claim 15, wherein the dimming speed is changed by changing a rate of a change amount of an illumination intensity of the illuminating part per unit time.

20. The control method according to claim 15, further comprising determining a direction of a change in a zoom magnification of the zoom lens, wherein the dimming speed is relatively increased when it is determined that the zoom magnification changes toward a tele side compared to when the zoom magnification changes toward a wide side.

* * * * *